(12) United States Patent
Jakubowski et al.

(10) Patent No.: US 10,667,489 B2
(45) Date of Patent: Jun. 2, 2020

(54) PET STROLLER WITH OVERSIZE ENCLOSURE

(71) Applicant: Vermont Juvenile Furniture Mfg., Inc., West Rutland, VT (US)

(72) Inventors: Chris Jakubowski, Rutland, VT (US); Todd Jakubowski, Rutland, VT (US); Kristen Jakubowski, Rutland, VT (US)

(73) Assignee: Vermont Juvenile Furniture, Mfg., Inc., West Rutland, VT (US)

( * ) Notice: Subject to any disclaimer, the term of this patent is extended or adjusted under 35 U.S.C. 154(b) by 297 days.

(21) Appl. No.: 15/806,809

(22) Filed: Nov. 8, 2017

(65) Prior Publication Data

US 2018/0132446 A1 May 17, 2018

Related U.S. Application Data

(60) Provisional application No. 62/420,786, filed on Nov. 11, 2016.

(51) Int. Cl.
*A01K 1/02* (2006.01)
*B62B 7/10* (2006.01)
(Continued)

(52) U.S. Cl.
CPC ............ *A01K 1/0236* (2013.01); *B62B 7/105* (2013.01); *B62B 9/12* (2013.01); *B62B 9/142* (2013.01);
(Continued)

(58) Field of Classification Search
CPC .... A01K 1/0236; A01K 1/0035; B62B 7/105; B62B 9/12; B62B 9/142; B62B 2202/42; B62B 2202/20; B62B 2205/20
See application file for complete search history.

(56) References Cited

U.S. PATENT DOCUMENTS 4,349,210 A * 9/1982 Rutt .................... A01K 1/0236
280/47.21
D308,656 S 6/1990 Takahashi
(Continued)

FOREIGN PATENT DOCUMENTS

CN 203450158 2/2014
CN 203920809 11/2014
(Continued)

*Primary Examiner* — Joshua D Huson
(74) *Attorney, Agent, or Firm* — Volpe and Koenig, P.C.

(57) ABSTRACT

A pet stroller is provided having a frame assembly which includes a base frame and a back frame. A handle is connected to the back frame. A platform is located on the base frame to define a pet seating area. Two rear wheels and at least one front wheel are connected to the base frame. Two foldable struts are provided, between the base and back frames that are lockable in an extended position and releasable to allow folding of the struts. A back door is connected by hinges to the back frame and has a releasable door latch. A canopy is provided including a cloth canopy assembly and the upper and lower canopy bars. A canopy latch releasably connects the lower canopy bar to a front cross member of the base frame to form an enclosed pet seating area. The platform forming the pet seating area is below a level defined by a top of the rear wheels, and preferably less than 12 inches above ground level, accommodating larger pets and eliminating the need to lift the pet into the pet seating area.

16 Claims, 13 Drawing Sheets

(51) Int. Cl.
   *B62B 9/12* (2006.01)
   *B62B 9/14* (2006.01)
   *B62B 9/20* (2006.01)
(52) U.S. Cl.
   CPC ............ *B62B 9/20* (2013.01); *B62B 2202/42* (2013.01); *B62B 2205/20* (2013.01)

(56) References Cited

U.S. PATENT DOCUMENTS

| | | |
|---|---|---|
| D415,073 S | 10/1999 | Meehan |
| D422,538 S | 4/2000 | Chen et al. |
| 6,267,080 B1 * | 7/2001 | Roy .................. A01K 1/02 119/453 |
| D475,660 S | 6/2003 | Licciardello |
| D478,198 S | 8/2003 | Koppes |
| D641,293 S | 7/2011 | Tsai |
| D643,345 S | 8/2011 | Barenbrug |
| D654,406 S | 2/2012 | Henry |
| D693,742 S | 11/2013 | Fredendall |
| D704,600 S | 5/2014 | Britton et al. |
| D723,746 S | 3/2015 | Jakubowski |
| D726,078 S | 4/2015 | Liao |
| D742,792 S | 11/2015 | Goldberg |
| D757,370 S | 5/2016 | Jakubowski |
| 9,399,477 B2 | 7/2016 | Iftinca et al. |
| D765,555 S | 9/2016 | Lai |
| D780,073 S | 2/2017 | Tsai |
| D782,370 S | 3/2017 | Pos |
| D789,252 S | 6/2017 | Qiu |
| D789,838 S | 6/2017 | Johar |
| D791,649 S | 7/2017 | Zhou |
| D793,914 S | 8/2017 | Eriksson |
| D795,140 S | 8/2017 | Butler |
| D801,592 S | 10/2017 | Jakubowski et al. |
| D802,489 S | 11/2017 | Stiba et al. |
| D816,555 S | 5/2018 | Young |
| D820,169 S | 6/2018 | Eriksson et al. |
| D825,400 S | 8/2018 | Hanson et al. |
| D834,457 S | 11/2018 | Laffan et al. |
| 2009/0302564 A1 * | 12/2009 | Evans .................. A01K 1/0236 280/47.38 |
| 2014/0191483 A1 | 7/2014 | Rolicki |
| 2014/0230747 A1 | 8/2014 | Jakubowski |
| 2014/0319884 A1 | 10/2014 | Doucette |
| 2016/0016601 A1 * | 1/2016 | Velichko .................. B62B 7/12 280/30 |
| 2017/0021851 A1 * | 1/2017 | Pujol .................. B62B 7/06 |
| 2018/0022371 A1 | 1/2018 | Jakubowski et al. |

FOREIGN PATENT DOCUMENTS

| | | |
|---|---|---|
| CN | 203920809 U * | 11/2014 |
| GB | 2511200 | 8/2014 |
| TW | M267130 | 6/2005 |

* cited by examiner

PET STROLLER WITH OVERSIZE ENCLOSURE

INCORPORATION BY REFERENCE

The following documents are incorporated herein by reference as if fully set forth: U.S. patent application Ser. No. 62/420,786, filed Nov. 11, 2016.

BACKGROUND

The invention relates to a pet stroller, more particularly, to a foldable pet stroller which is openable to a use position, and foldable, when not in use, to a compact storage position.

Foldable pet strollers of the above-noted type are known and can be used for walking small or medium sized pets, such as dogs or cats, in a manner similar to a toddler stroller. Typically pet strollers include a closed canopy so that a pet can be confined in a seating area without having to be clipped or tied in by a lead that is connected to the stroller. The canopy would typically include a mesh area.

These strollers typically are formed with a metal frame having a cloth and mesh holding assembly attached to the metal frame which define a seating area as well as the cloth and mesh canopy. Typically, the metal frame includes front and rear wheel struts which are pivotally connected to a handle and a seating area platform, as well as additional support structure. These frame members are pivotably connected at certain pivot areas to allow pivoting movement between the handle, the front struts and the rear struts in order to extend the frame from the compact storage position to a use position where the handle and struts can be locked in position using lock assemblies, and can then be re-folded back down to the compact storage position upon releasing the locks. In the compact storage position, the handle and struts generally fold to a position adjacent to one another, and the cloth and mesh seating area and canopy generally collapse together.

The known pet strollers are usually limited with respect to the size of the pet that can be accommodated, and require lifting the pet and placing the pet in the stroller enclosure area, typically located 15-20 inches off of the ground, and then either connecting the pet's collar to a restraining leash, or using the canopy to enclose the peat seating area.

It would be desirable to provide a pet stroller that accommodates larger pets and eliminates the requirement to have to lift the pet into the pet stroller seating area.

SUMMARY

Briefly stated, a pet stroller is provided having a frame assembly which includes a base frame with first and second base side members, front and rear cross members extending between the first and second base side members, and optionally may include an intermediate cross member. A back frame having first and second side members and a back cross member located between the first and second side members is provided, with the first and second side members being pivotably connected at first ends thereof to the base frame. A handle is connected to the second ends of the first and second side members. A platform is located on the base frame to define a pet seating area. Two rear wheels are connected to the base frame and at least one front wheel is connected to the base frame. Preferably there are two front wheels and they are mounted as casters.

Two foldable struts are provided, with each of the foldable struts being pivotably connected to a respective one of the first and second base side members and a respective one of the first and second side members. Each of these pivotable struts has an intermediate hinge and a latch assembly that is lockable in an extended position of the foldable struts and releasable to allow folding of the foldable struts. A back door having a hinged connection to the first side member is provided. A door latch is connected to the back door and the second side member. The door latch is closeable to hold the back door in a closed position and releasable to allow the back door to pivot open about the hinged connection to the first side member. A canopy is provided comprising a cloth canopy assembly and the upper and lower canopy bars. The upper and lower canopy bars are pivotably connected to the frame assembly to extend or retract the cloth canopy assembly over the pet seating area. A canopy latch releasably connects the lower canopy bar to the front cross member to form an enclosed pet seating area.

Preferably, the upper and lower canopy bars are pivotably connected to the first and second base side members. This arrangement provides for a front entrance for the pet seating area by releasing the canopy latch and lifting the lower and upper canopy bars, folding the cloth canopy assembly upwardly away from the platform allowing a pet to step into the pet seating area. Alternatively, by releasing the door latch connected to the back door, the back door can be pivoted open about its hinged connection to the first side member allowing a pet to step into the enclosed pet seating area with the canopy already being in the closed position. Here, due to the platform forming the pet seating area being below a level defined by a top of the rear wheels, and preferably less than 12 inches above ground level, a pet owner does not need to lift a larger size pet into the pet stroller and instead the pet can step in. Further, by providing the platform at this lower height to define the pet seating area, the pet stroller can accommodate larger pets.

In one preferred arrangement, a back of the canopy is connected to the back cross member.

In a preferred arrangement, the handle is pivotably connected to the second ends of the first and second side members, preferably with the handle being lockable in at least one of a plurality of different pivot positions. In a preferred arrangement, the handle is formed as a U-shaped tube member, and the base frame and back frames are also formed with tubes. The canopy bars can also be formed with tubes and/or solid bar members.

Preferably, the cloth canopy assembly is assembled from cloth panels and includes one or more mesh areas.

In one preferred arrangement, the first and second base side members and the front cross member are formed of a single continuous tube. Preferably, the rear cross member and a lower edge of the back door are arranged horizontally in a use position and are generally aligned.

For more convenient storage, the pet stroller is preferably foldable from a use position in which the back frame is located at an angle of 85°-95° relative to the base frame and the two foldable struts are in the extended position, to a stowed position, in which the latch assembly on each of the struts is released allowing folding of the foldable struts such that the back frame is pivoted downwardly to a position on top of the base frame. For further compact folding, the handle is preferably pivotably connected to the second ends of the first and second side members, and in the stowed position, the handle is pivoted to a position overlying the first and second side members.

Preferably, the platform is located on the base frame to define the pet seating area which is 12" or less from a ground level, and more preferably 8" or less from the ground level defined by ground contact surfaces of the rear wheels and the at least one front wheel.

It is further preferred that in a use position, a top edge of the rear door is generally aligned with the back cross member.

BRIEF DESCRIPTION OF THE DRAWINGS

The following detailed description of the preferred embodiments of the invention will be better understood when read with reference to the appended drawings. For the purposes of illustrating the invention, there is shown in the drawing an embodiment which is presently preferred. It is understood, however, that the invention is not limited to the precise arrangements and instrumentality shown in the drawings.

DETAILED DESCRIPTION OF THE PREFERRED EMBODIMENTS

Certain terminology is used in the following description for convenience only and is not limiting. The words "right", "left", "top", "bottom", "front", and "back" designate directions in the drawings to which reference is made. The words "inwardly" and "outwardly" refer to directions toward and away from, respectively, the geometric center of the pet stroller and designated parts thereof. This terminology includes the words specifically noted above, derivatives thereof and words of similar import. The words "a" and "one", as used in the claims and in the corresponding portion of the specification, are defined as including one or more of the referenced item unless specifically stated otherwise. A list of items in the form "at least one of A, B, or C" where A, B, and C represent various elements of the invention, means any one of A, B, or C or various combinations thereof.

Referring now to FIGS. 1-15, the pet stroller 10 in accordance with a preferred embodiment is shown. The pet stroller 10 includes a frame assembly 20 formed from two major components including a base frame 30 and a back frame 50. The base frame 30 shown most clearly in FIG. 9 includes a first base side member 32 and a second base side member 34, a front cross member 36, and a rear cross member 38. Preferably, at least one intermediate cross member 40A is provided. Additional intermediate cross members can be provided such as 40B, 40C, shown in FIG. 9. Preferably, the first and second base side members 32, 34 and the front cross member 36 are formed as a single continuous tube. The intermediate cross member(s) 40A, 40B, 40C can also be formed of tubular members that are riveted, welded, or otherwise connected between the first and second base side members 32, 34.

Figure 3:
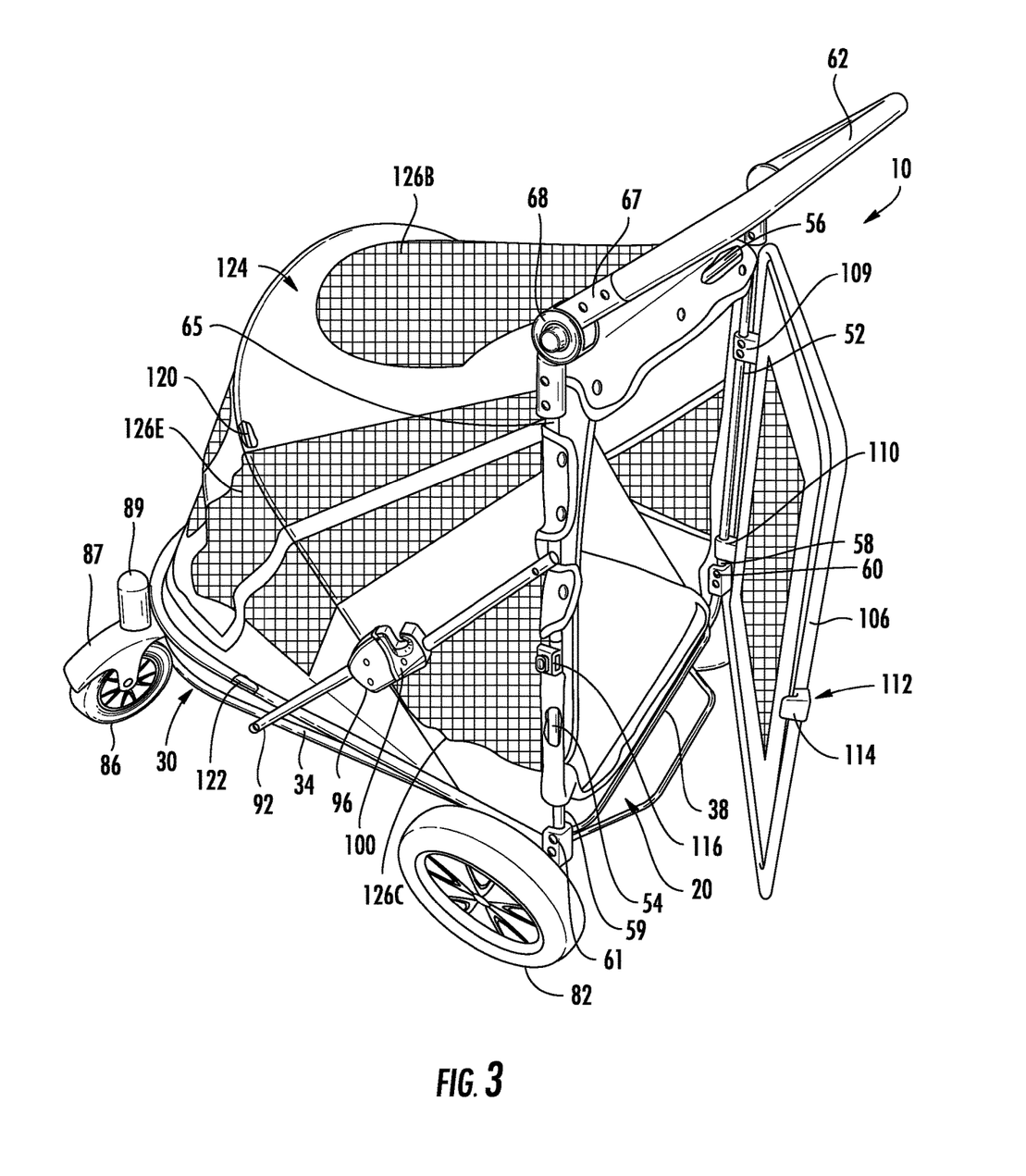
FIG. 3 is a top, right, rear view of the pet stroller shown in FIG. 1 with the canopy closed and the back door open.
Figure 7:
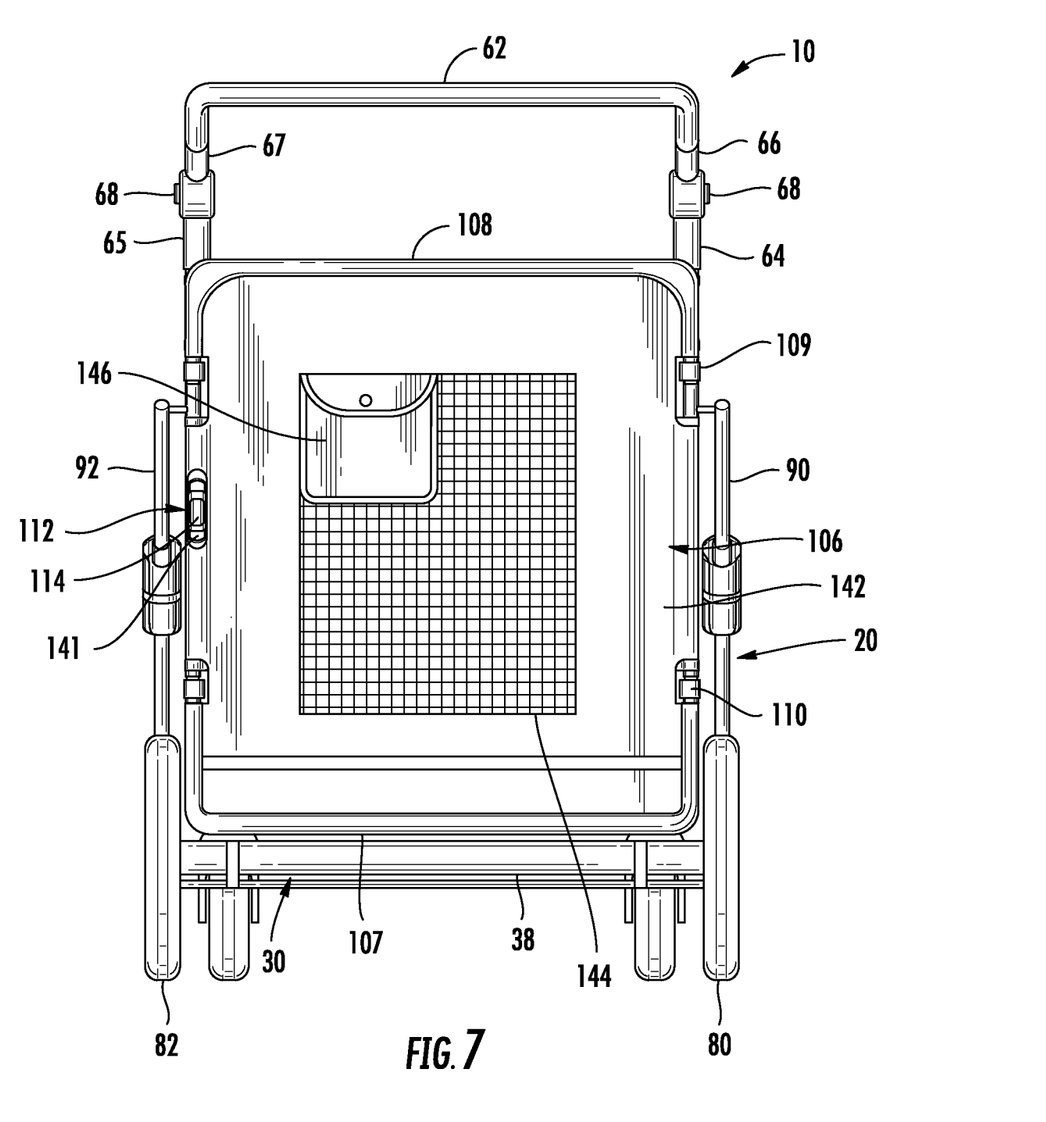
FIG. 7 is a rear elevational view of the pet stroller shown in FIG. 1.
Figure 9:
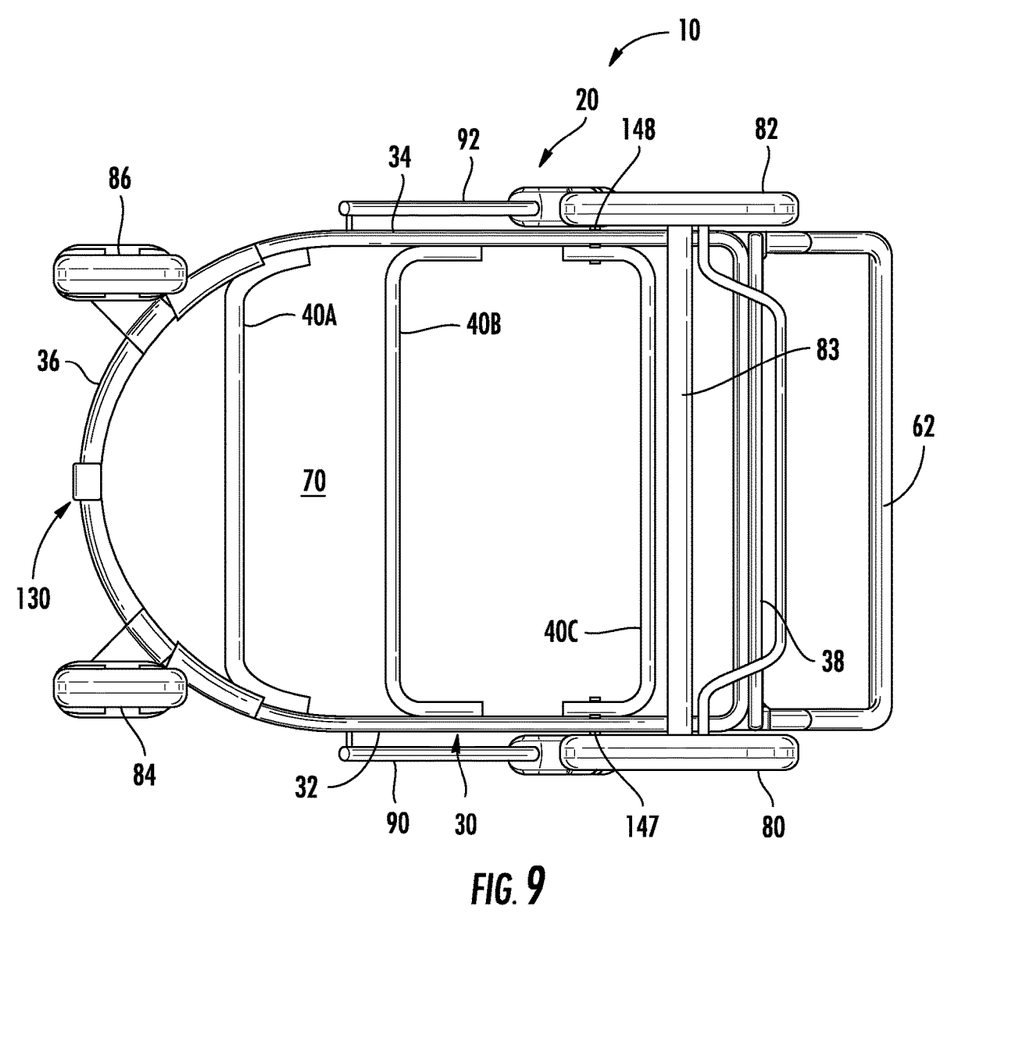
FIG. 9 is a bottom view of the pet stroller shown in FIG. 1.

As shown most clearly in FIGS. 3, 7, and 9, the back frame 50 has a first side member 52 and a second side member 54. A back cross member 56 is located between the first and second side members 52, 54. The first and second side members 52, 54 are pivotably connected at first ends 58, 59, shown most clearly in FIGS. 3, 5, 6, and 14 to the base frame 30. These pivotable connections are formed by a pivot pin 60, 61 that extends through an upstanding arm or clevis member attached to the base frame 30 at the back corners in the area of the rear cross member 38.

Figure 12:
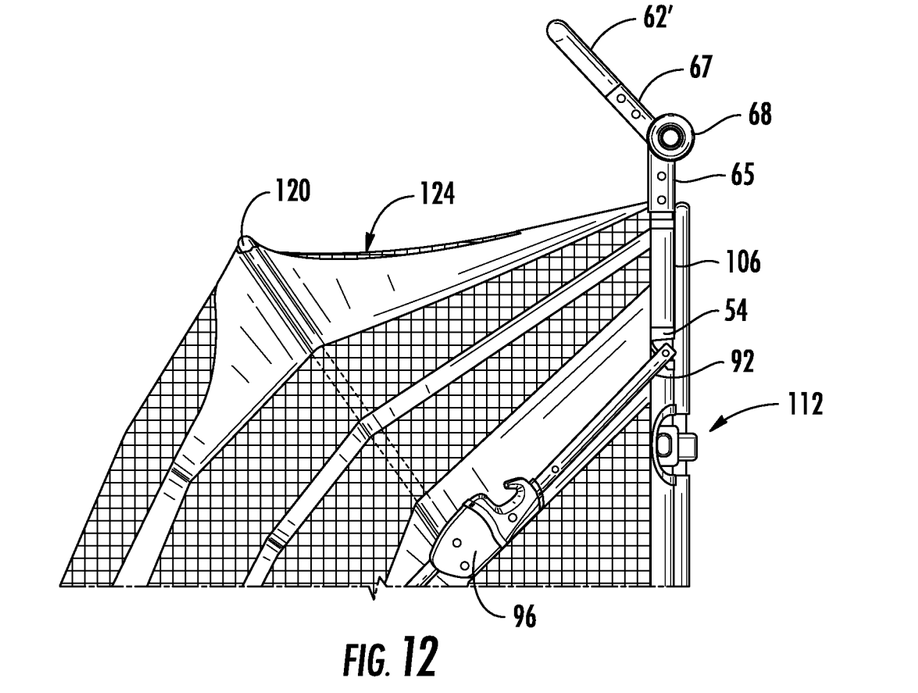
FIG. 12 is an enlarged view of a top portion of the pet stroller showing the handle pivoted to a forward position.
Figure 13:
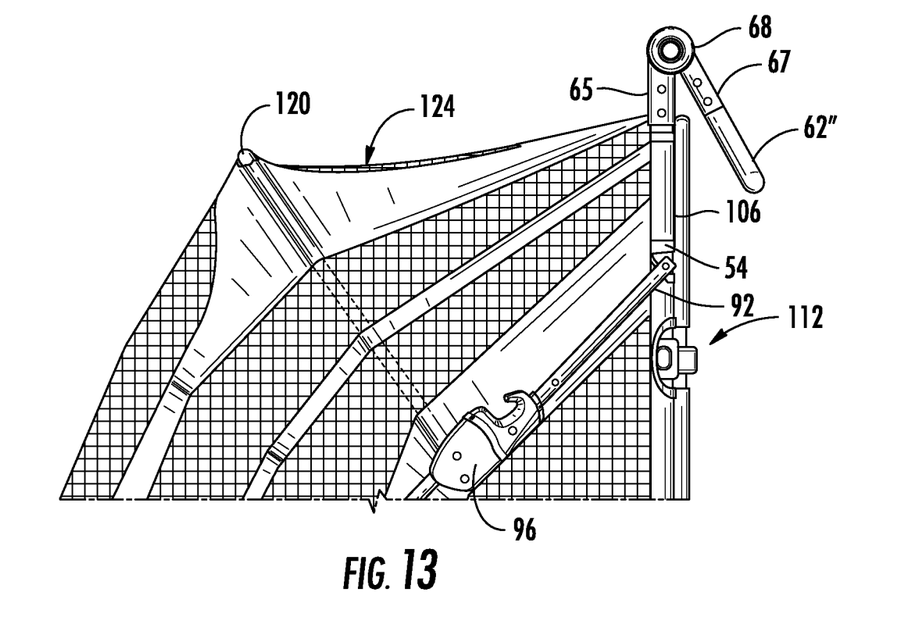
FIG. 13 is a view similar to FIG. 12 showing the handle pivoted rearwardly to a downward most position.

As shown in FIGS. 1, 2, 7, and 8, a handle 62 is connected to the second ends 64, 65 of the first and second side members 52, 54. Preferably, handle 62 is pivotably connected to the second end 64, 65 of the first and second side members 52, 54. The pivotable connection is preferably formed by a locking pivot assembly 68 of the type known to those skilled in the art which includes a press button with a detent mechanism which, when pressed in, allows the handle 62 to be rotated, and when released, springs out locking the handle 62 in the desired pivot position. FIGS. 12 and 13 illustrate two different positions 62', 62" of the handle. However, multiple different positions can be provided allowing a user to select the best position depending upon a height of the user, etc.

Preferably a handle 62 is formed as a U-shaped tube member and can be connected to the locking pivot assemblies on either end 66, 67 using rivets or other mechanical fasteners or an interference fit.

Preferably, the base frame 30 and the back frame 50 are formed of metal tubes. However, other materials could be utilized and the tubes could be solid bars. Preferably, the tubes have a rounded cross-sectional profile.

Figure 1:
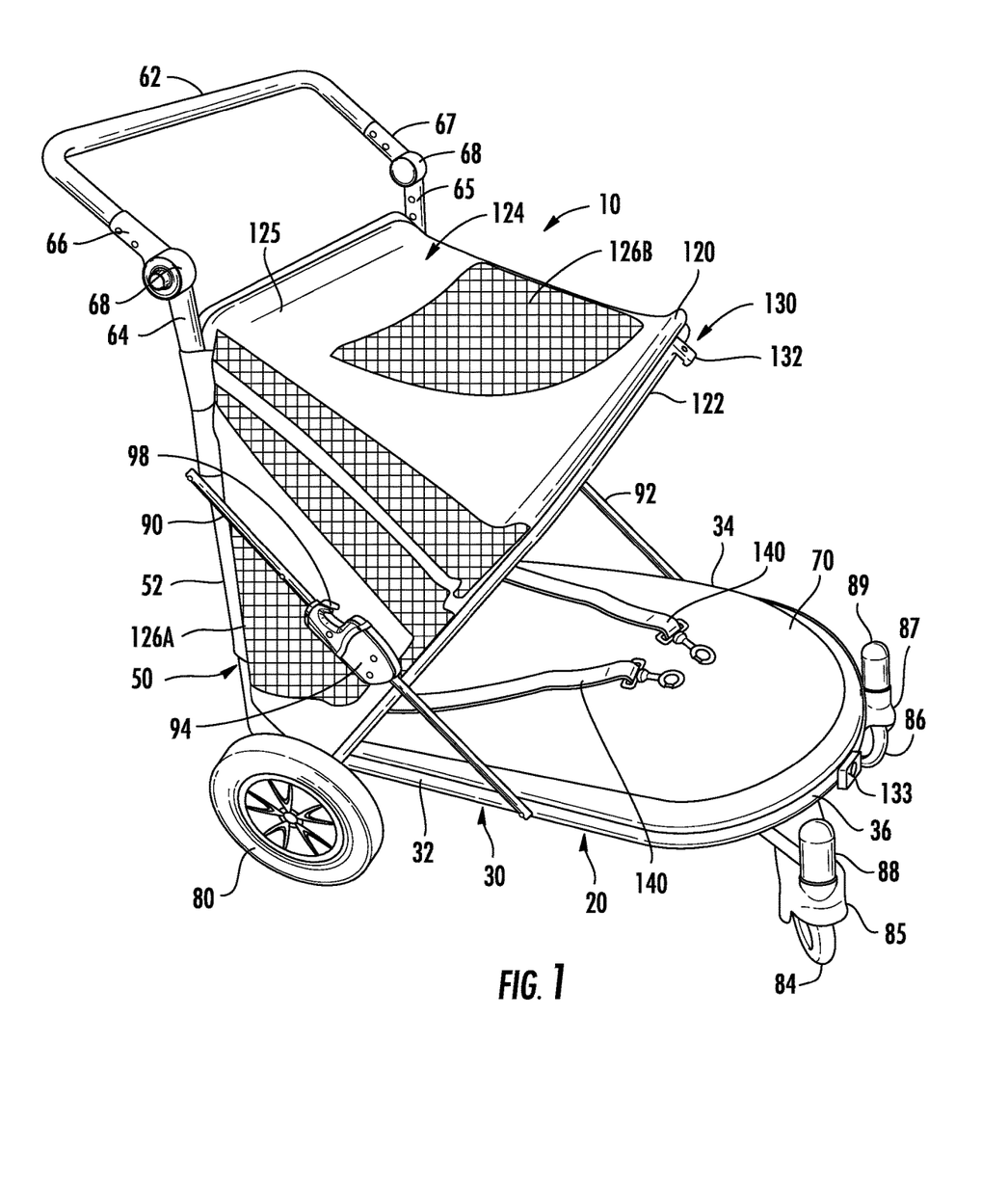
FIG. 1 is a top, front, left perspective view of a pet stroller shown with the canopy in an open position.
Figure 2:
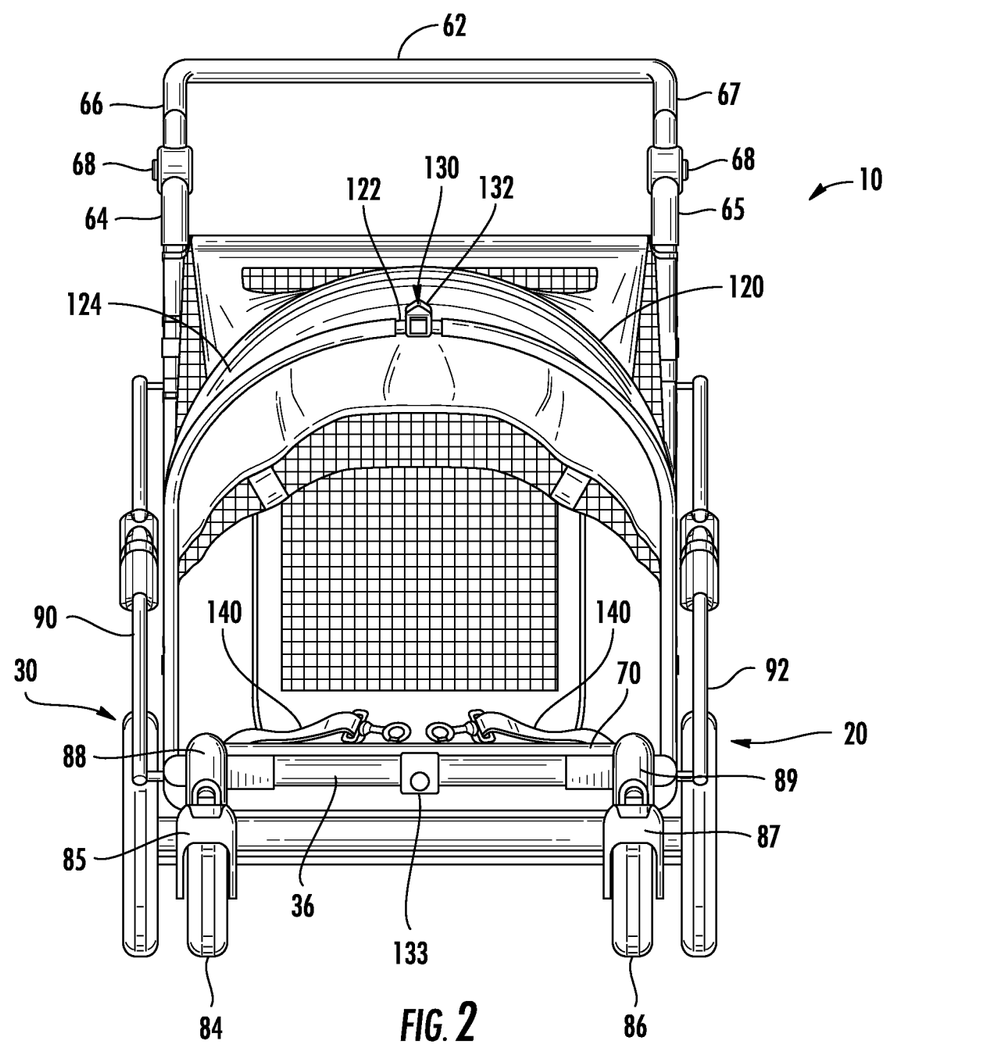
FIG. 2 is a front view of the pet stroller shown in FIG. 1 shown with a canopy in the open position.

Referring to FIGS. 1-3, which show various open positions of the pet stroller 10, a platform 70 is located on the base frame 30 to define a pet seating area. The platform 70 can be made of any suitable rigid material and is preferably covered with a fabric or a plastic coating to allow for ease of cleaning. As shown in FIG. 1, lanyards 140 can be attached to the frame and may be used to connect to a collar of the pet in order to hold the pet in position in the pet seating area.

Figure 8:
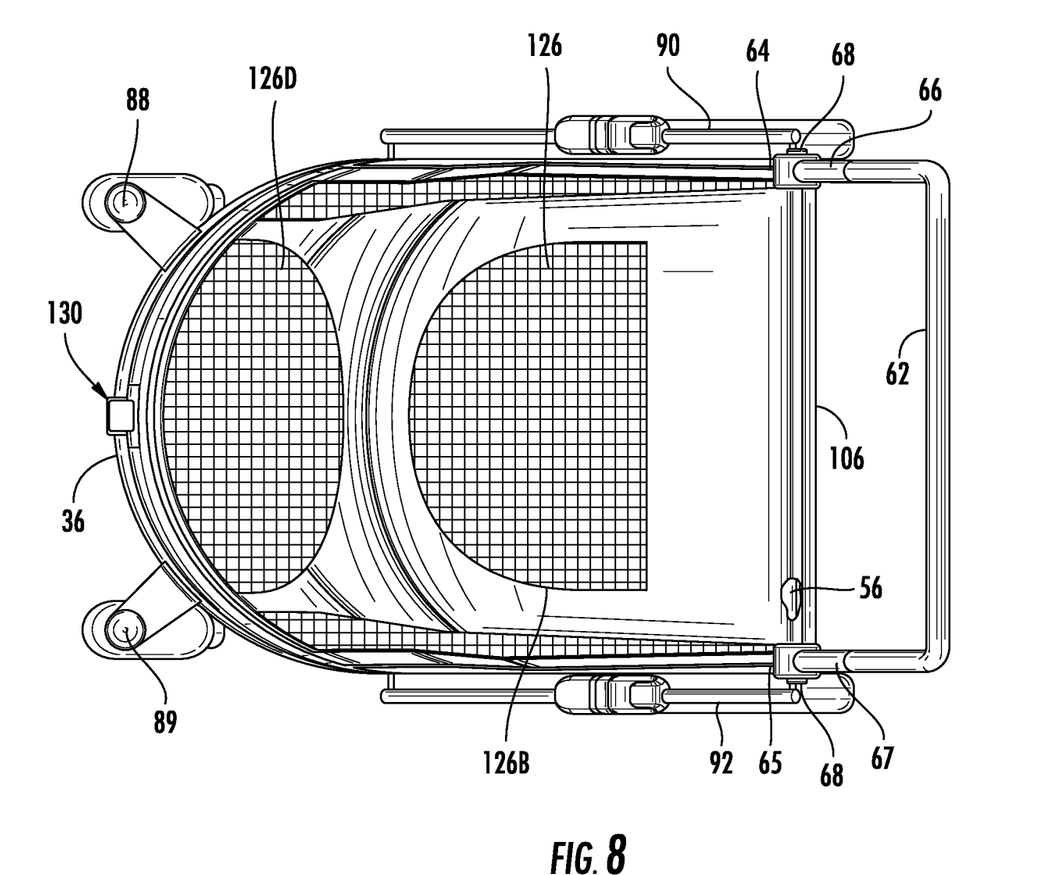
FIG. 8 is a top view of the pet stroller shown in FIG. 1.

The pet stroller 10 preferably includes two rear wheels 80, 82, shown in detail in FIGS. 7 and 8. As shown in detail in FIG. 8, these rear wheels 80, 82 can be connected to an axle 83 or mounted with stub axles or using other suitable means to the base frame 30. A stop mechanism is shown which engages on inner gear teeth located on each of the two rear wheels 80, 82, as shown in FIG. 9. This has not been described in further detail herein as such rear wheel mechanisms are well known in the art.

Figure 4:
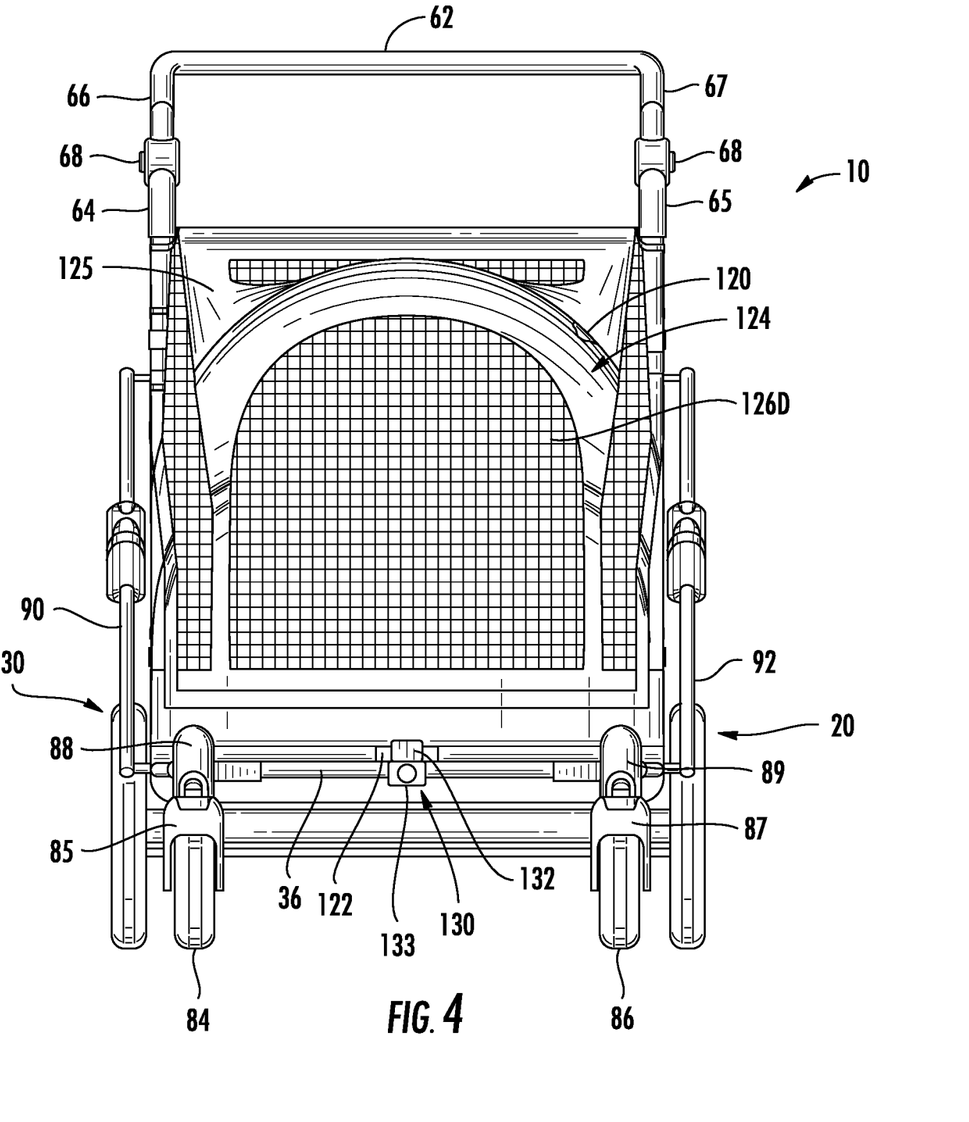
FIG. 4 is a front view of the pet stroller shown in FIG. 1 with the canopy in the closed position.

Referring to FIGS. 2, 4, and 9, preferably at least one front wheel 84, 86, and more preferably two front wheels 84, 86 are connected to the base frame 30. The front wheels 84, 86 are preferably located in front wheel housings 85, 87 respectively, which cover the tops of the wheels to prevent potential catching or interference with the front wheels 84, 86. These wheel housings 85, 87 are preferably pivotably connected to front wheel bearing supports 88, 89 that allow these front wheel housings to pivot about a vertical axis while the wheels are mounted for rolling movement about a horizontal axis in each of the front wheel housings 85, 87. This provides a caster arrangement for the front wheels. While this is a preferred arrangement, those skilled in the art will recognize that a single fixed front wheel could be utilized rather than two front wheels 84, 86, as shown. Further, other types of casters could also be utilized rather than the specific embodiment described. The wheels 80, 82, 84, 86 can be pneumatic or solid. Preferably the rear wheels 80, 82 have a greater diameter than the front wheels.

Referring now to FIGS. 1, 3, 5, and 6, two foldable struts 90, 92 are provided. Each of the foldable struts 90, 92 is pivotably connected to a respective one of the first and second base side members 32, 34 and a respective one of the first and second side members 52, 54. Each of the foldable struts has an intermediate hinge 94, 96 and a latch assembly 98, 100 that is lockable in an extended position of the foldable struts 90, 92, and releasable to allow folding of the foldable struts 90, 92 as illustrated in detail in FIG. 14. Preferably the latch assembly 98, 100 includes an upper portion that can be slid upwardly along the respective strut 90, 92 in order to release an internal catch from the hinge portion which includes a receiving recess that receives the catch when the upper and lower portions of the struts 90, 92 are aligned with one another. Those skilled in the art will recognize that other types of latch assemblies can be utilized and that the specific arrangement of the latch assemblies is not critical to the invention.

Referring now to FIGS. 3 and 7, a back door 106 having a hinged connection, preferably with hinges 109, 110, is connected to the first side member 52. The back door 106 includes a lower edge 107 that is arranged horizontally and generally aligned with the rear cross member 38. Additionally, in a use position a top edge 108 of the rear door 106 is generally aligned with the back cross member 56.

Preferably, the back door 106 is formed with a tubular frame 141 and includes a cloth cover 142, preferably including a mesh section 144. As shown in FIG. 7, a storage pocket 146 can also be provided. In addition, or alternatively to the pocket, a cup holder could be connected to the back door 106 so that it is in proximity to a user pushing the handle 62.

Figure 11:
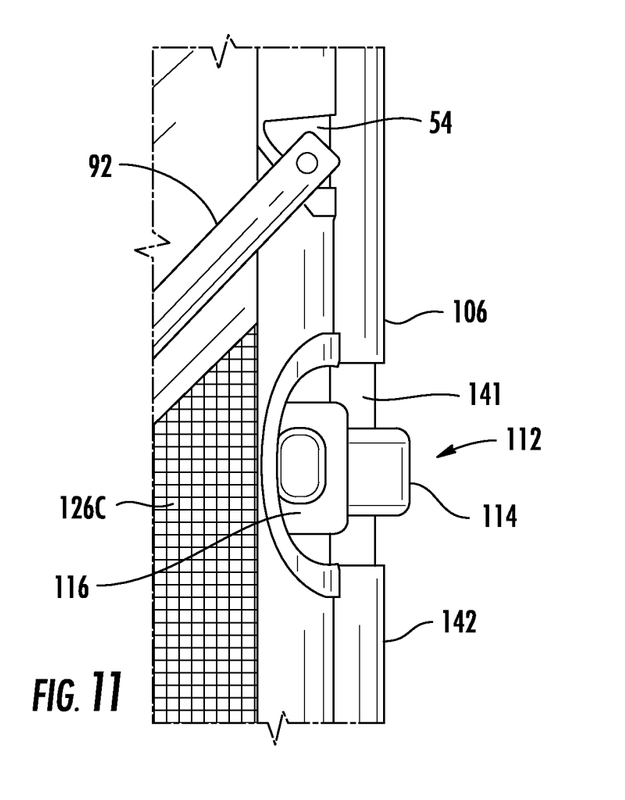
FIG. 11 is an enlarged detailed view showing the door latch for the back door in an open position.

Referring to FIGS. 3 and 11, the back door includes a door latch 112 that is connected to the back door 106 and the second side member 54 that allows the back door to be opened and closed. The door latch 112 is closeable to hold the back door 106 in a closed position and releasable to allow the back door 106 to pivot about the hinged connection defined by the hinges 109, 110 connected to the first side member 52 to an open position. The latch 112 preferably includes a door side part 114 and a frame side part 116 which are engagable and releasable from one another. One preferred arrangement is shown in enlarged detail in FIG. 11 where the door side part 114 includes a catch member that is insertable into a receiving opening in the frame side part 116 and is held in place by a detent button. Pressing in on the detent button allows the door side part to be released from the frame side part in order to open the back door 106 to allow a pet to enter or exit the pet seating area on the platform 70.

Referring now to FIGS. 1-8, a canopy 124 is provided having upper and lower canopy bars 120, 122 that are pivotably connected to the frame assembly 20 to extend or retract the canopy 124 over the pet seating area. The upper and lower canopy bars 120, 122 are preferably pivotably connected to the first and second base side members 32, 34 of the base frame 30 at pivot points 147, 148 which are indicated in FIG. 9. The canopy 124 includes a cloth canopy assembly 125 that is connected to the frame assembly 20 as well as the upper and lower canopy bars 120, 122. The cloth canopy assembly 125 is preferably stitched or glued together from cloth and mesh panels and is connected using snaps, VELCRO® textile fastening strips, or other removable means so that the cloth canopy assembly 125 can be removed for cleaning, if necessary.

Preferably, the cloth canopy assembly 125 includes at least one mesh portion 126A. More preferably, as shown in FIGS. 1-8, there are several mesh portions 126A-126F located on the cloth canopy assembly 125 in order to allow for both visibility and air flow for the pet in the pet seating area.

Figure 10:
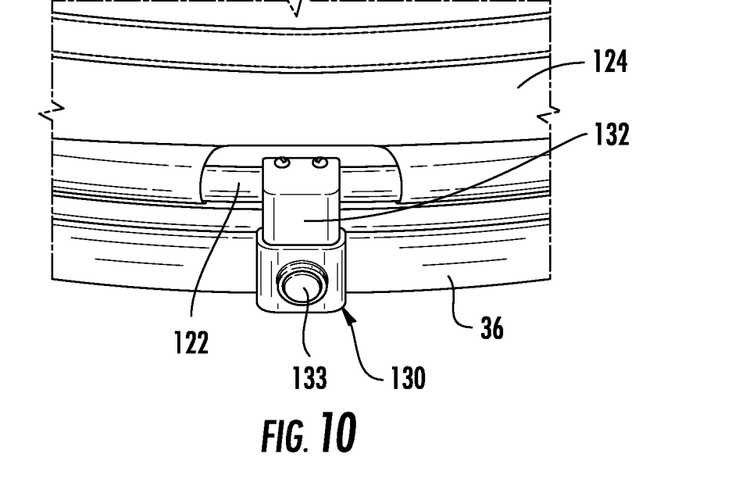
FIG. 10 is an enlarged detailed view of the front of the pet stroller showing the canopy latch.

As shown in detail in FIGS. 2 and 10, a canopy latch 130 with parts 132 and 133 is provided that releasably connects the lower canopy bar 122 to the front cross member 36 of the base frame 30 to form an enclosed pet seating area. The back of the canopy 124 is connected to the back cross member 56 at the back of the stroller, which is preferably aligned with a top edge of the back door 106.

As shown in FIGS. 1-3, in the use position, the platform 70 that forms the pet seating area is generally horizontal and located at a level below a level defined by a top of the rear wheels 80, 82. In a preferred embodiment, the platform 70 is located on the base frame 30 to define the pet seating area that is 12" or less above a ground level defined by ground contact surfaces of the rear wheels 80, 82 and the at least one front wheel 84, 86. More preferably, the pet seating area is located 6" or less from the ground level. This arrangement allows the user to place the pet in the pet seating area by either releasing the canopy latch 130 and opening the canopy 124 by lifting up on the lower canopy bar 122 to the position shown in FIG. 1, allowing the pet to enter, and then closing the canopy 124 by lowering the lower canopy bar 122 and re-latching the canopy latch 130 resulting in the closed stroller appearing as in FIGS. 4-6. Alternatively, depending upon the pet and whether or not it is amenable to entering beneath the open canopy 124, it would also be possible to release the door latch 112 and open the back door 106 to allow a higher height opening at the entry point for the pet, increasing pet comfort in climbing into the enclosed pet seating area. Based on the height of the platform 70 from the ground level, this can be easily accomplished by a pet that is being placed into the pet stroller 10 without the need for the owner to lift the pet. Further, given the lowered location of the platform 70 that forms the pet seating area (Preferably 12" or less from ground lever, and more preferably 6" or less) relative to other known pet strollers, the present pet stroller 10 accommodates intermediate to large size pets with greater ease and more comfort.

Figure 5:
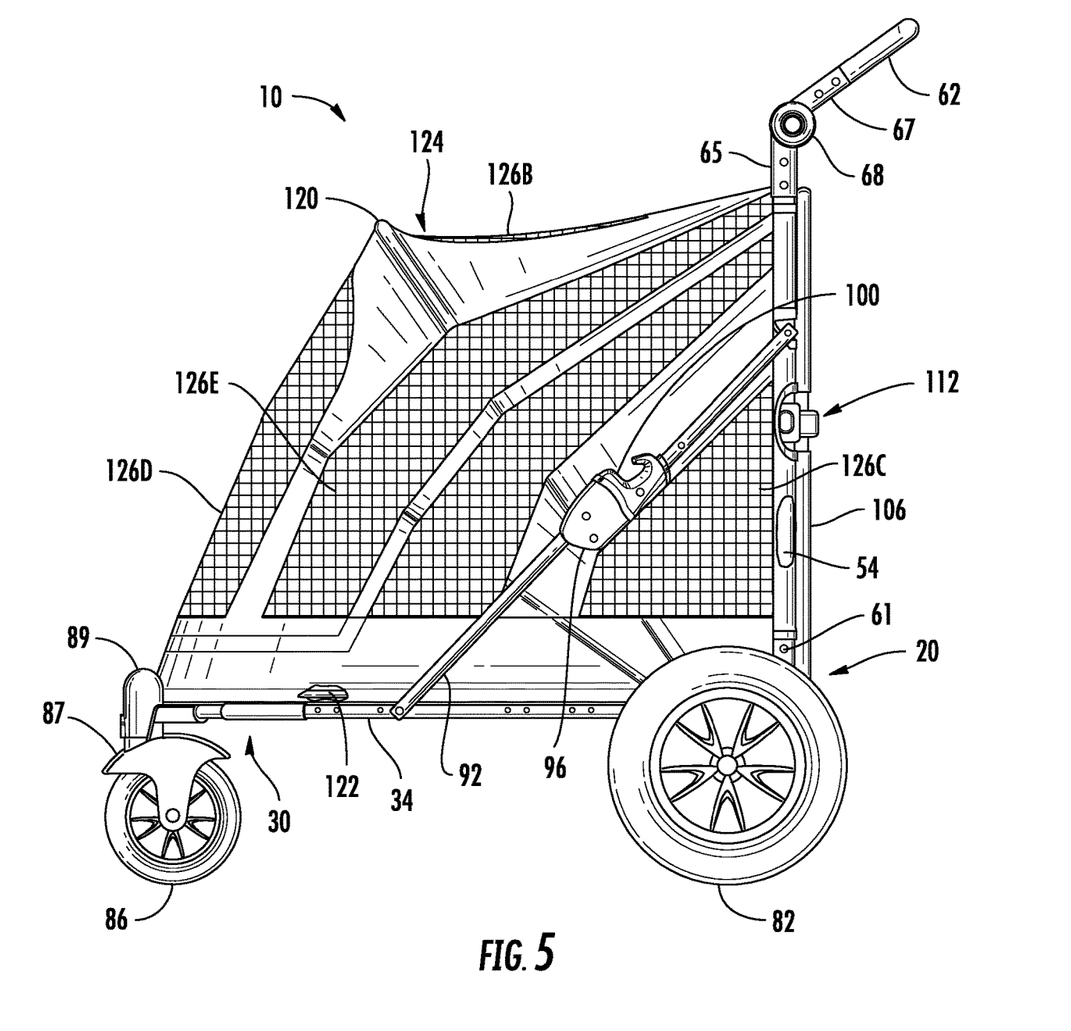
FIG. 5 is a right side view of the pet stroller shown in FIG. 1.
Figure 6:
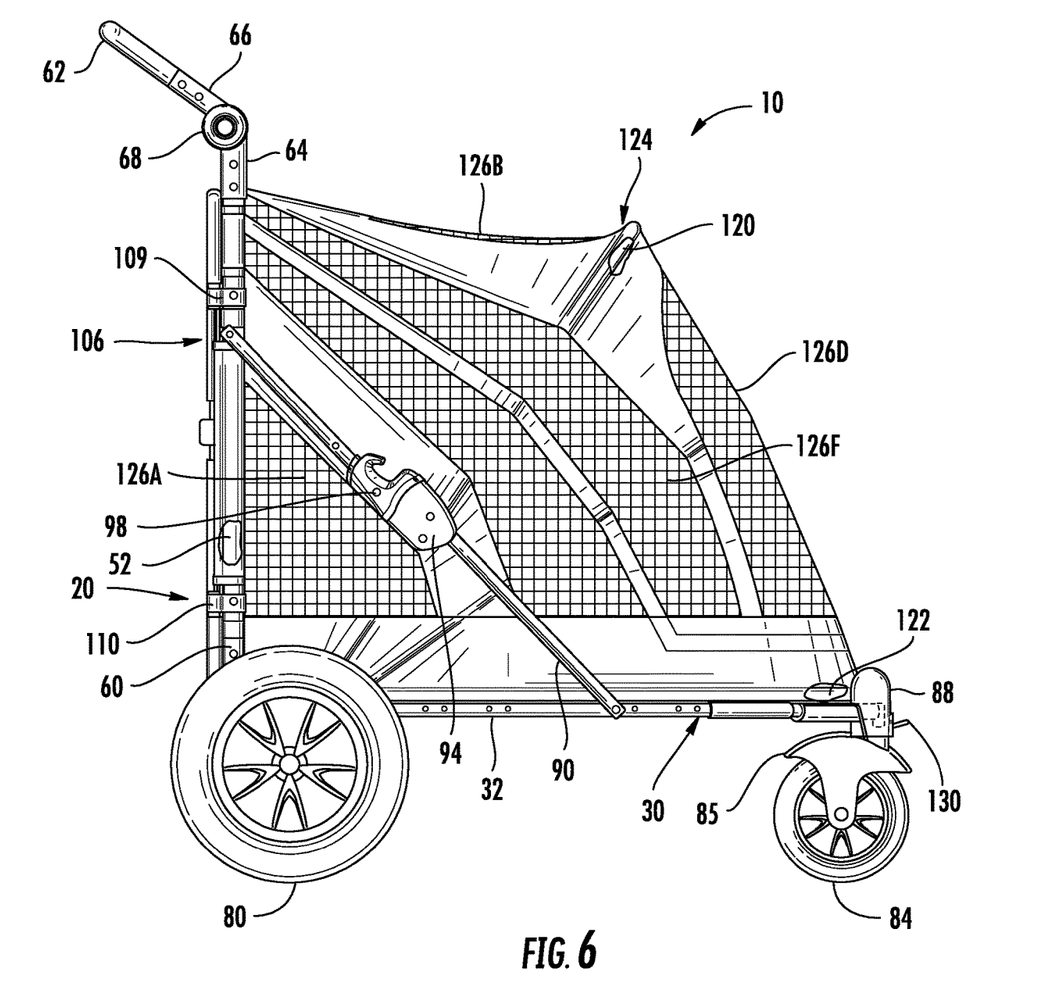
FIG. 6 is a left side view of the pet stroller shown in FIG. 1.
Figure 14:
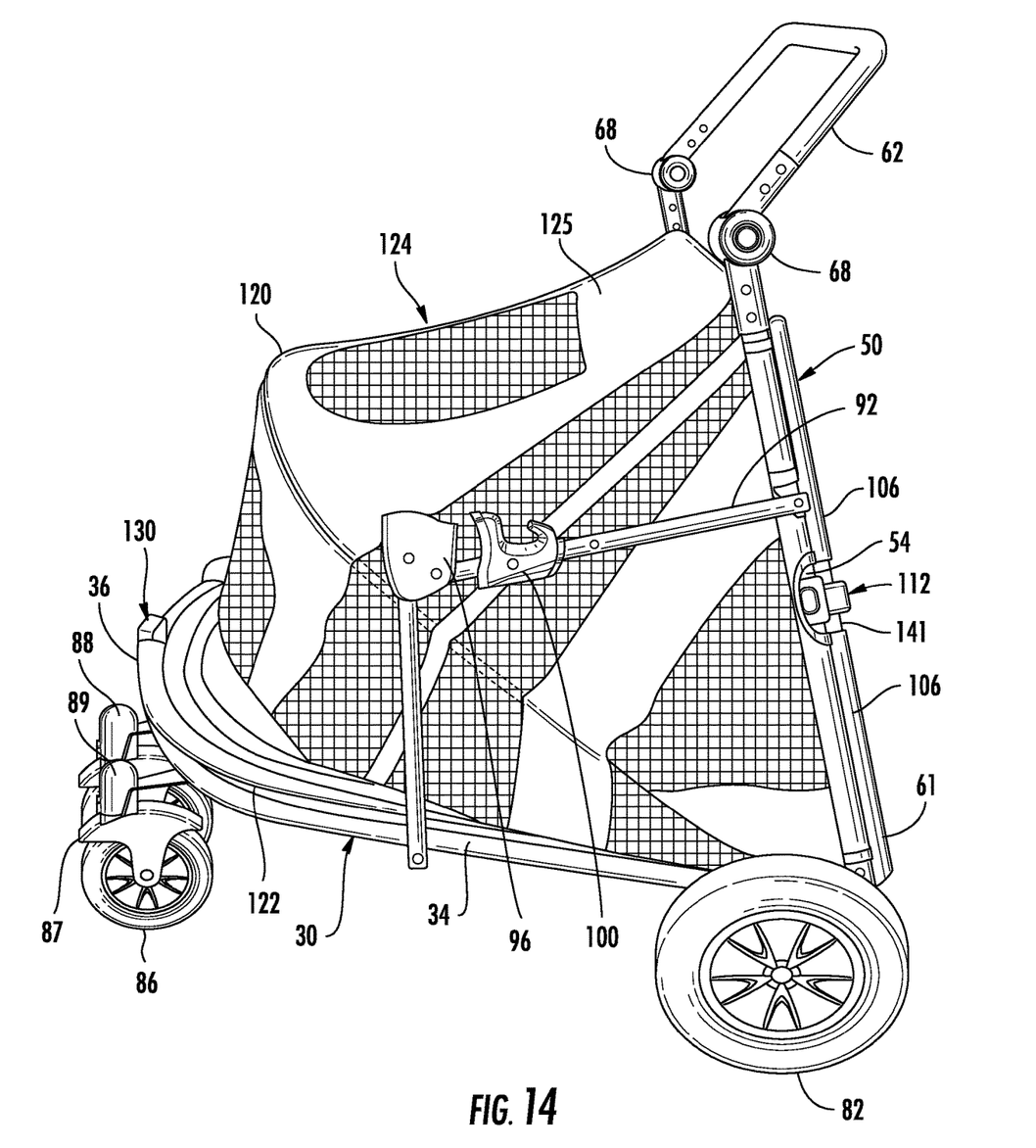
FIG. 14 is a top, front, left perspective view showing the pet stroller in a partially collapsed position with the latch assemblies on the two foldable struts having been released in order to allow folder of the pet stroller.
Figure 15:
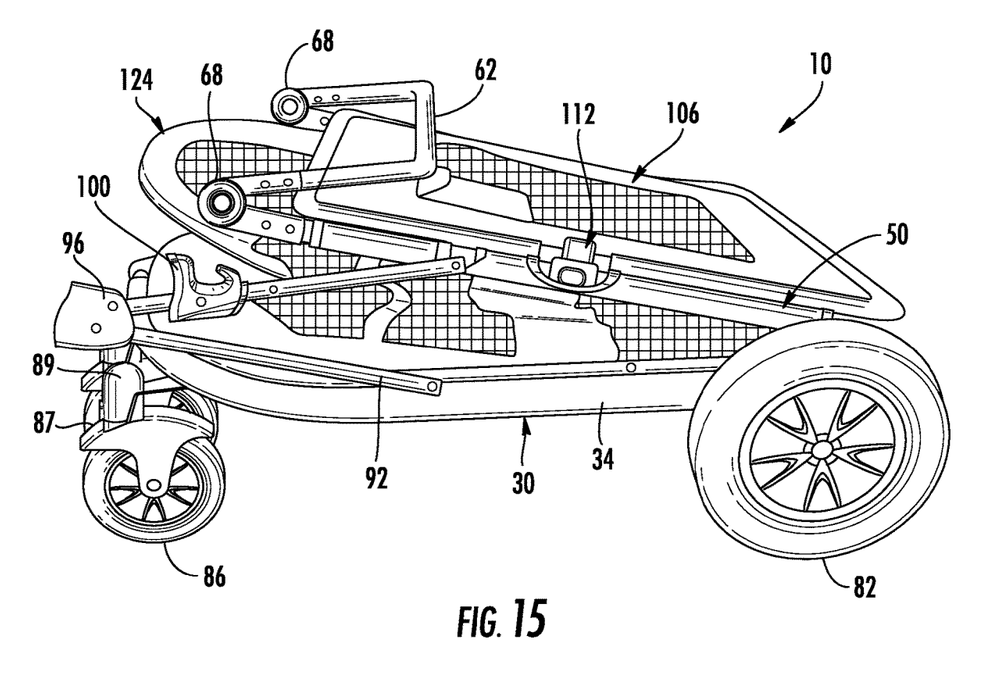
FIG. 15 is a side view showing the pet stroller in the fully folded, storage position.

Referring now to FIGS. 5, 14, and 15, the pet stroller 10 is foldable from a use position, shown in FIG. 5, in which the back frame 50 is located at an angle of 85° to 95°, and more preferably 90°, relative to the base frame 30, with the two foldable struts 90, 92 being in the extended position, to a stowed position, shown in FIG. 15 in which the latch assemblies 98, 100 of each of the foldable struts 90, 92 are released allowing folding of the foldable struts 90, 92 such that the back frame 50 is pivoted downwardly, through the position shown in FIG. 14, to a position on top of the base frame 30 as shown in FIG. 15. Further, as shown in FIG. 15, the handle 62 is pivotable to a stowed position, with the handle 62 being in a position overlying the first and second base side members 32, 34. This allows for compact storage of the pet stroller 10. Moving the pet stroller 10 back to the use position can be easily accomplished by pivoting the back frame 50 upwardly away from the base frame 30 to a position in which the struts 90, 92 are generally straight with the upper portions being axially aligned with the lower portions and reengaging the latch assemblies 98, 100. The position of the handle 62 can then be adjusted as desired by the user.

While the preferred embodiment of the present invention has been described in detail, it will be recognized by those skilled in the art from the present disclosure that changes may be made to the above described embodiment of the invention without departing from the broad inventive concept thereof. It is understood, therefore, that this invention covers all modifications that are within the scope and spirit of the invention as defined by the appended claims and/or shown in the attached drawings.

What is claimed is:

1. A pet stroller, comprising:
    a frame assembly including:
        a base frame having first and second base side members, front and rear cross members extending between the first and second base side members;
        a back frame having first and second side members and a back cross member located between the first and second side members, the first and second side members being pivotably connected at first ends thereof to the base frame; and
        a handle connected to second ends of the first and second side members;
    a platform located on the base frame to define a pet seating area;
    two rear wheels connected to the base frame and at least one front wheel connected to the base frame;
    two foldable struts, each of the foldable struts being pivotably connected to a respective one of the first and second base side members and a respective one of the first and second side members, each of the foldable struts having an intermediate hinge and a latch assembly that is lockable in an extended position of the foldable struts and releasable to allow folding of the foldable struts;
    a back door having a hinged connection to the first side member;
    a door latch connected to the back door and the second side member, the door latch being closable to hold the back door in a closed position and releasable to allow the back door to pivot open about the hinged connection to the first side member providing clear open access to a level of the platform;
    a canopy with upper and lower canopy bars, each having two ends that are respectively pivotably connected to the first and second base side members, the upper and lower canopy bars support a cloth canopy assembly to extend or retract over the pet seating area; and
    a canopy latch that releasably connects the lower canopy bar to the front cross member to form an enclosed pet seating area, and is openable to provide clear open access to the level of the platform.

2. The pet stroller of claim 1, wherein there are two of the front wheels located on the base frame.

3. The pet stroller of claim 2, wherein the front wheels are casters.

4. The pet stroller of claim 1, wherein the platform forming the pet seating area is generally horizontal in a use position and located at a horizontal level below a horizontal level defined by a top of the rear wheels.

5. The pet stroller of claim 1, wherein a back of the canopy is connected to the back cross member.

6. The pet stroller of claim 1, wherein the handle is pivotably connected to the second ends of the first and second side members.

7. The pet stroller of claim 6, wherein the handle is lockable in at least one of a plurality of different pivot positions.

8. The pet stroller of claim 1, wherein the handle is formed as a U-shaped tube member, the base frame and the back frame are formed from tubes, and the lower canopy bar is a solid bar.

9. The pet stroller of claim 1, wherein the cloth canopy assembly includes at least one mesh portion.

10. The pet stroller of claim 1, wherein the pet stroller is foldable from a use position in which the back frame is located at an angle of 85° to 95° relative to the base frame with the two foldable struts being in the extended position, to a stowed position in which the latch assemblies are released allowing folding of the foldable struts such that the back frame and the upper and lower canopy bars are pivoted downwardly to a position on top of the base frame.

11. The pet stroller of claim 10, wherein the handle is pivotably connected to the second ends of the first and second side members, and in the stowed position, the handle is pivoted to a position overlying the first and second side members.

12. The pet stroller of claim 1, wherein the first and second base side members and the front cross member are formed of a single continuous tube.

13. The pet stroller of claim 1, wherein in a use position, the rear cross member and a lower edge of the back door are arranged horizontally and are generally aligned to close off the pet seating area.

14. The pet stroller of claim 1, wherein in a use position, the platform located on the base frame to define the pet seating area is 12 inches or less from a ground level defined by ground contact surfaces of rear wheels and the at least one front wheel.

15. The pet stroller of claim 1, wherein in a use position, a top edge of the rear door is generally aligned with the back cross member.

16. The pet stroller of claim 1, further comprising at least one intermediate cross member extending between the first and second base side members.

* * * * *